UNITED STATES PATENT OFFICE.

MARK W. MARSDEN, OF PHILADELPHIA, PENNSYLVANIA.

METHOD OF TREATING VEGETABLE FIBER.

1,269,476.  Specification of Letters Patent.  Patented June 11, 1918.

No Drawing.  Application filed February 6, 1917. Serial No. 146,895.

*To all whom it may concern:*

Be it known that I, MARK W. MARSDEN, a citizen of the United States, residing at Philadelphia, in the county of Philadelphia and State of Pennsylvania, have invented certain new and useful Improvements in Methods of Treating Vegetable Fiber, of which the following is a specification.

My present invention has relation to the treatment of vegetable fiber with particular regard to its ultimate recovery in the form of pulp for the manufacture of paper and for other purposes, and it is more directly concerned with the digester phase of the treatment, it being the object of the invention to utilize, as the solvent element, certain raw materials which may be obtained in large quantities and at small cost at points in or conveniently located with respect to the cotton belt or other fiber producing fields.

The proposed solvent is not only more economical and otherwise as well suited as the chemicals generally employed in the performance of its principal office, namely the separation and removal of the incrusting and other difficultly soluble matters, but possesses the added advantage that it acts as a bleach starter.

To practice the invention I make a solution of salt (sodium chlorid) by dissolving from twenty-five to thirty-five pounds, more or less, of salt in one hundred gallons of water, the proportions being regulated according to the strength of liquor desired. I then add from twelve to fifteen pounds, more or less of burned or unslaked lime (quick lime) and after permitting the liquor to stand for awhile or until the lime is completely slaked I run it through a strainer so as to remove grit and other foreign bodies. It is then ready for use although, if desired, it may first be clarified.

The fibrous material to be digested having been previously treated according to my well known process for the removal of the extractive matter, is treated, that is to say boiled either in an open or closed digester, but preferably the latter so as to use steam under pressure, together with the above solvent reduced by the addition of water to a density of from twelve to fifteen degrees Baumé, more or less, according to the nature of the material undergoing treatment. The effect of this is to rapidly dissolve and completely remove the incrusting and other adhesive matters without weakening or otherwise deleteriously affecting the fiber bundles, so that by subsequent washing and straining the latter are in excellent condition for conversion into pulp for the manufacture of paper and the like.

The action of the lime in combination with the sodium chlorid serves a double purpose in that it not only acts as a solvent in the manner and for the purpose described, but through the agency of the chlorin generated it also acts as a preliminary bleach. Hence, the regular bleaching whether by the electric, chlorid of lime or other treatment is considerably simplified and consequently cheapened.

Having described the nature and object of the invention, I claim:—

1. The method herein-described for treating vegetable fiber for its ultimate recovery as pulp, which consists in removing the incrusting and other difficultly soluble bodies by subjecting the prepared stock to the solvent action of a mixture of sodium chlorid and lime in the presence of heat, moisture, and pressure.

2. The method herein-described for treating vegetable fiber for its ultimate recovery as pulp, which consists in digesting it with a solution of lime and sodium chlorid having a density of from twelve to fifteen degrees Baumé, more or less.

3. The method herein-described for treating vegetable fiber for its ultimate recovery as pulp, which consists in digesting it with a substantially two to one solution of sodium chlorid and lime.

4. A solvent and bleach starter for the purpose stated, consisting of sodium chlorid and lime dissolved in water.

5. A solvent and bleach starter for the purpose stated, consisting of from twenty-five to thirty-five pounds, more or less, sodium chlorid and from twelve to fifteen pounds, more or less, unslaked lime, dissolved in one hundred gallons, more or less, of water.

In testimony whereof I affix my signature in the presence of two witnesses.

MARK W. MARSDEN.

Witnesses:
  ALLAN I. HUCKINS,
  E. W. STRAIN.